United States Patent [19]
Schuller et al.

[11] Patent Number: 6,109,896
[45] Date of Patent: Aug. 29, 2000

[54] PISTON PUMP

[75] Inventors: Wolfgang Schuller, Sachsenheim; Norbert Alaze, Markgroningen, both of Germany

[73] Assignee: Robert Bosch GmbH, Stuttgart, Germany

[21] Appl. No.: 09/068,794
[22] PCT Filed: Jun. 3, 1997
[86] PCT No.: PCT/DE97/01101
§ 371 Date: May 18, 1998
§ 102(e) Date: May 18, 1998
[87] PCT Pub. No.: WO98/12434
PCT Pub. Date: Mar. 26, 1998

[30] Foreign Application Priority Data

Sep. 19, 1996 [DE] Germany .............................. 196 38 200
Mar. 22, 1997 [DE] Germany .............................. 197 12 147

[51] Int. Cl.⁷ .............................. F04B 39/10; F16K 15/00
[52] U.S. Cl. .......................... 417/549; 417/554; 137/519.5
[58] Field of Search ....................... 417/470, 549, 417/554; 137/519.5, 516.15

[56] References Cited

U.S. PATENT DOCUMENTS

| 5,086,738 | 2/1992 | Kubis et al. | 123/322 |
| 5,123,819 | 6/1992 | Schuller et al. | 417/569 |
| 5,199,860 | 4/1993 | Stegmaier | 417/566 |
| 5,577,896 | 11/1996 | Harada | 417/259 |
| 5,823,639 | 10/1998 | Zinnkann et al. | 303/116.4 |

*Primary Examiner*—Henry C. Yuen
*Assistant Examiner*—Mahmoud M Gimie
*Attorney, Agent, or Firm*—Ronald E. Greigg; Edwin E. Greigg

[57] ABSTRACT

A piston pump for pumping hydraulic fluid, especially for vehicle brake systems having a stepped piston axially displaceable in a pump space. The stepped piston in order to reduce the production costs comprises a cylinder of substantially constant outer diameter and a bush which is held axially nondisplaceably on the cylinder, by being press-fitted onto the cylinder. An elastomer seal is slipped onto a cylinder portion defined by the bush seals off the cylinder from the wall of the pump space and divides the pump space into two pump chambers of variable chamber volume.

20 Claims, 2 Drawing Sheets

PISTON PUMP

PRIOR ART

The invention is based on a piston pump for pumping hydraulic fluid, particularly for vehicle brake systems.

In a known piston pump of this type (German Patent Disclosure DE 44 07 978 A1), the stepped piston is produced as a one-piece turned part, in which a plurality of annular grooves are punched to make pump chambers and for receiving seals. Such a pump piston, because of the expense for machining, is very cost-intensive. The stepped piston has one region with a larger diameter and another region with a smaller diameter. In order to obtain a clearly apparent distinction between these two diameters, a great deal of material has to be removed from the stepped piston, which involves considerable labor. The stepped piston is also supported axially displaceably in the region of its smaller diameter. Because of this support, the stepped piston must also have good shape and surface quality in this region as well. Because the diameter of the stepped piston is reduced at this bearing point, the requisite shape and surface quality can be achieved only with increased effort.

In another known piston pump of this type (French Patent Disclosure FR 1 218 349 A1), the stepped piston is embodied in two parts and comprises a piston cylinder, which is guided in the larger-diameter portion of a stepped bore and which defines one pump chamber with each of its end faces facing away from one another, and a piston rod, guided in the smaller-diameter portion of the bore, and this rod is passed through a pump chamber and with a collar on its end form-lockingly engages a recess machined into the end face of the piston cylinder. This two-part nature of the pump again entails high production costs, especially since the piston cylinder and the piston rod require separate guides for their axial motion. Because the piston cylinder and the piston rod are each guided separately, this means overall a long structural length, because of the requisite minimum guide lengths.

ADVANTAGES OF THE INVENTION

The piston pump of the invention has the advantage over the prior art that the stepped piston can be produced very economically and has a marked cost advantage over a one-piece turned part or a stepped piston divided into two parts, that is, a piston rod and a piston cylinder. Thus, for the piston pump of the invention, with the advantage, dictated by the stepped nature of the pump piston, of higher pumping capacity even at low temperatures, the market for more-economical brake systems for vehicles of the lower price class is also opened up, which can help improve the braking performance in this class.

BRIEF DESCRIPTION OF THE DRAWINGS

The invention is described in further detail in the ensuing description in terms of exemplary embodiments shown in the drawing. Shown are.

DESCRIPTION OF THE EXEMPLARY EMBODIMENTS

Figure 1:
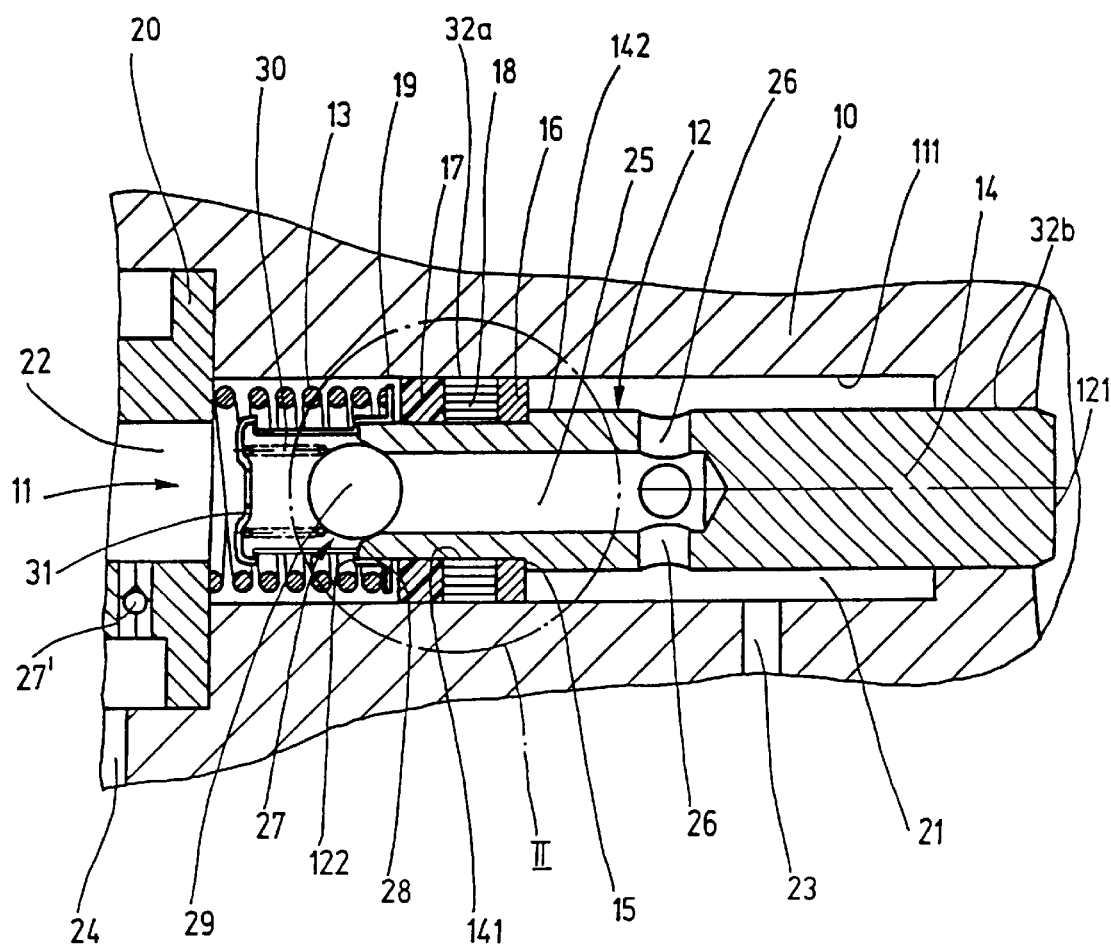
FIG. 1, a fragmentary longitudinal section through a piston pump for a vehicle brake system.

The piston pump shown in fragmentary longitudinal section in FIG. 1 for pumping hydraulic fuel is intended particularly as a pump in a vehicle brake system and is used for controlling the pressure in wheel brake cylinders. Depending on the type of brake system, the abbreviations ABS, ASR, FDR and EHB are used for such brake systems. In the brake system, the pump serves for instance to feed back brake fluid from one or more wheel brake cylinders to a master cylinder (ABS), and/or for pumping brake fluid out of a supply container into one or more wheel brake cylinders (ASR, FDR and EHB). The pump is required for instance in a brake system with wheel slip control (ABS or ASR) and/or in a brake system serving as a steering aide (FDR) and/or in an electrohydraulic brake system (EHB). With the wheel slip control (ABS or ASR), for instance, locking of the wheels of the vehicle during a braking event when strong pressure is exerted on the brake pedal can for instance be prevented (ABS), and/or spinning of the driven wheels of the vehicle when there is strong pressure on the gas pedal can be prevented (ASR). In the case of a brake system used as a steering aide (FDR), independently of an actuation of the brake pedal or gas pedal, a brake pressure in one or more of the wheel brake cylinders is built up, for instance to keep the vehicle from leaving the track chosen by the driver. The pump can also be used in an electrohydraulic brake system (EHB), in which the pump pumps the brake fluid into the wheel brake cylinder or cylinders whenever an electrical brake pedal sensor detects an actuation of the brake pedal, or in which the pump is used to fill a reservoir of the brake system.

The piston pump has a pump body 10, in which a cylindrical pump space 11 is formed. A stepped piston 12 is guided axially displaceably in the pump space 11; it is driven by a drive member, not shown here, which engages the end face 121 of the stepped piston 12 located on the right in terms of FIG. 1, to execute a reciprocating motion counter to the restoring force of a pump spring. As described in German Patent Disclosure DE 44 07 978 A1, the drive member may be an encompassing cam, against whose outer circumference the end face 121 of the stepped piston 12 is pressed by the pump spring 13.

For the sake of economical production, the stepped piston 12 comprises a solid cylinder 14 and a support disk or bush 16 held firmly on the cylinder 14. The solid cylinder 14 is reduced somewhat by turning in its portion on the left in FIG. 1, and as a result there are a smaller-diameter cylinder portion 141 and a larger-diameter cylinder portion 142, at the transition of which from one to the other a radially extending shoulder 15 is formed. The diameter of the smaller-diameter cylinder portion 141 is only slightly smaller than the diameter of the larger-diameter cylinder portion 142, so that only little removal or reshaping of material is needed in order to obtain the shoulder 15 on the solid cylinder 14. The bush 16 is press-fitted onto the smaller-diameter cylinder portion 141 and is supported on the shoulder 15. An elastomer seal 17 is also slipped onto the cylinder portion 141 to seal off the stepped piston 12 from the cylinder wall 111 of the pump space 11. A slide ring 18 of polytetrafluoroethylene (PTFE) is disposed between the bush 16 and the elastomer seal 17. The slide ring 18 is likewise slipped, with slight pressure, onto the smaller-diameter cylinder portion 141. It provides for a first guide 32a of the stepped piston 12 in the region of the end face 122 in the cylinder wall 111 of the pump body 10.

The cylinder wall 111 of the pump body 10 is stepped, and in the region of one end face 121 of the stepped piston 12, the cylinder wall has a smaller diameter than in the region of the other end face 122 of the stepped piston 12. The result in the region of the end face 121 is a second guide 32b that guides the stepped piston 12. In the region of the end face 122, the stepped piston 12 is guided on the outer diameter of the slide ring 18. This creates the desired graduation of the effective surface area of the stepped piston 12, with the attendant advantages of the stepped nature of the stepped piston 12, including particularly at low temperatures. For the sake of sealing between the pump body 10 and the solid cylinder 14, an encompassing groove with a sealing ring placed in the groove may be provided, although not shown, in the region of the second guide 32b in the pump body 10. Because the bush 16 is not mounted until after the surface machining of the cylinder 14, the cylinder 14 has its largest diameter in the region of the second guide 32b, which makes the cylinder 14 easy to machine. The cylinder 14 can therefore be provided with a good dimensional, shape and surface quality in the region of the guide 32b without major effort; this produces a good guide 32b and has a favorable influence on the durability of the seal provided in the region of the guide 32b.

The pump spring 13, embodied as a helical compression spring, is supported at one end on an abutment 20 inserted into the pump space 11 and at the other end on a spring plate 19, resting on the left end face 122 of either the stepped piston 12 or the solid cylinder 14; the spring plate is axially spaced apart from the elastomer seal 17 and extends in such a way that the elastomer seal 17 is not axially prestressed.

The stepped piston 12 divides the pump space 11 into two separate pump chambers 21, 22. The pump chamber 21 communicates with a pump inlet via an intake conduit 23, and the pump chamber 22 communicates with a pump outlet, via a pressure conduit 24. The pump chamber 21 will hereinafter be called the low-pressure chamber 21, and the pump chamber 22 will hereinafter be called the high-pressure chamber 22. In the stepped bore 12, a central blind bore 25 is made from the end face 122, on the one hand, and on the other a plurality of radial bores 26 that discharge into the blind bore 25 are made, transversely to the blind bore 25. Via the blind bore 25 and the radial bores 26, there is communication between the pump chamber 21 and the pump chamber 22, and this communication is closable by means of a first check valve 27. In order to make the check valve 27, a valve seat 28 surrounding the blind bore 25 is machined into the end face 122 of the stepped piston 12, and a valve ball 29 of a valve closing spring 30 is press-fitted onto the valve seat. The valve closing spring 30, likewise embodied as a helical compression spring is supported by one end on the valve ball 29 and by the other end on a spring holder 31, which is secured to the spring plate 19 for the pump spring 13. The valve closing spring 30 is substantially weaker than the pump spring 13.

Between the high-pressure chamber 22 and the pressure conduit 24, there is a second check valve 27', which for the sake of greater simplicity is merely symbolically represented. The first check valve 27 functions as an inlet valve, and the second check valve 27' functions as an outlet valve.

In the position of the stepped piston 12 shown in FIG. 1, this piston has reached its terminal stroke position, in which the piston has been displaced the farthest to the left in terms of FIG. 1 and in the process has pumped hydraulic fluid out of the pump chamber 22 to the pump outlet, via the second check valve 27' and the pressure conduit 24. In the return motion of the stepped piston 12 (to the right in FIG. 1), which now ensues under the influence of the pump spring 13, the check valve 27 opens, and hydraulic fluid flows out of the pump chamber 21 into the pump chamber 22 via the bores 25, 26. When the stepped piston 12 moves back to the left in terms of FIG. 1, then with the check valve 27 closed, hydraulic fluid is pumped out of the pump chamber 22 via the pressure conduit 24 to the pump outlet, and because of the difference in diameter of the two guides 32a and 32b, at the same time hydraulic fluid flows into the pump chamber 21 to replenish it via the intake conduit 23.

The communication shown by way of example between the pump chamber 21 and the pump chamber 22 may also be embodied differently. For instance, this communication can also lead through the pump body 10. The check valve 27, which permits a flow out of the pump chamber 21 to the pump chamber 22 but blocks off the opposite flow direction can also be replaced by a means of edge control, for instance.

For the press fit of the bush 16 on the smaller-diameter cylinder portion 141 of the solid cylinder 14, a precise fit is necessary. To that end, in the exemplary embodiment shown in FIG. 1, an adequate dimensional, shape and surface quality of the smaller-diameter cylinder portion 141 is necessary. If in a cylindrical body a region of reduced diameter is to be provided that has particularly high dimensional, shape and surface quality, this means increased effort, which is greater than if the cylindrical body with the same properties were to be machined only in the region of its largest diameter.

To enable slipping the bush 16 onto the stepped piston 12 without damage, it is advisable, in the variant embodiment shown in FIG. 1, to provide a chamfer at the transition between the left-hand end face 122 and the smaller-diameter cylinder portion 141. Producing this chamfer is not especially complicated or expensive, but because the pump is made in large numbers, overall the chamfer plays a significant role.

Figure 2:
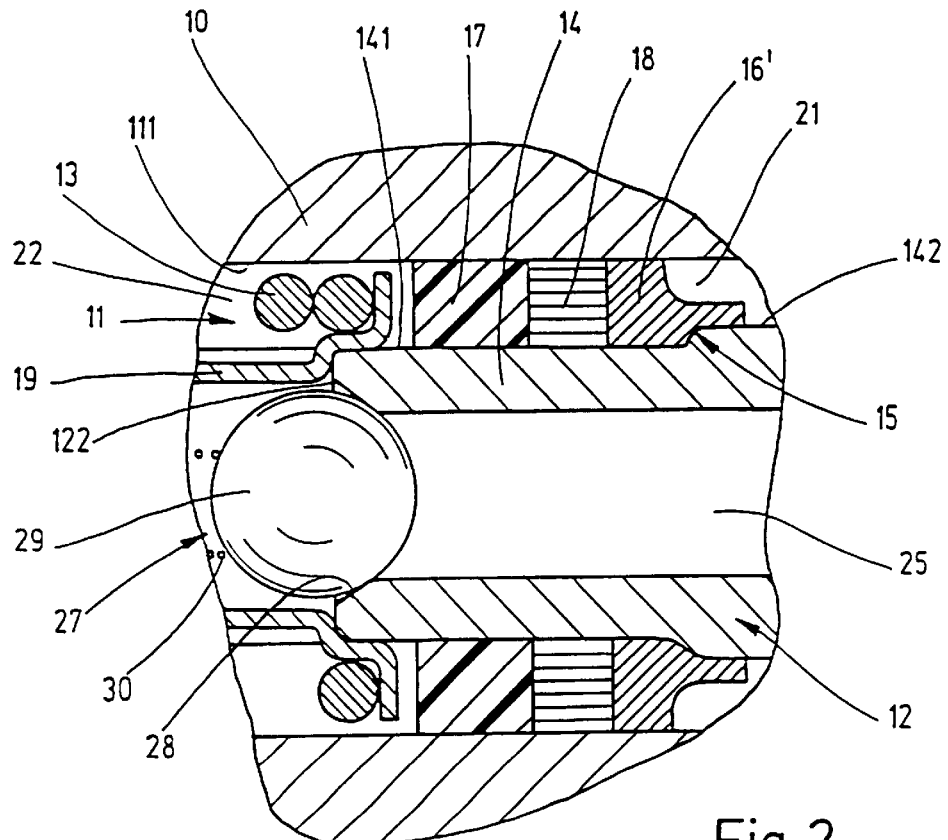
FIG. 2, an enlarged view of detail II in FIG. 1 for a modified piston pump.

To circumvent these difficulties in production and to reduce the production cost for the solid cylinder 14, in the modified exemplary embodiment of the piston pump shown in fragmentary form in FIG. 2, the bush 16' is provided with an inner bore that is graduated in the axial direction. The outer diameter of the larger-diameter cylinder portion 142 has extremely precise tolerances, because it can be ground through, resulting in a good, secure press fit of the bush 16'. The production of the larger-diameter cylinder portion 142 with high dimensional, shape and surface quality, because through-grinding is possible, is relatively simple. To make the smaller-diameter cylinder portion 141 with the same qualities, the expense would be greater. Otherwise, the piston pump shown in fragmentary form in FIG. 2 matches the piston pump shown in FIG. 1 and described in conjunction with FIG. 1, so that identical components are provided with the same reference numerals, and to this extent the description of FIG. 1 applies to FIG. 2 as well.

Figures 3A, 3B:
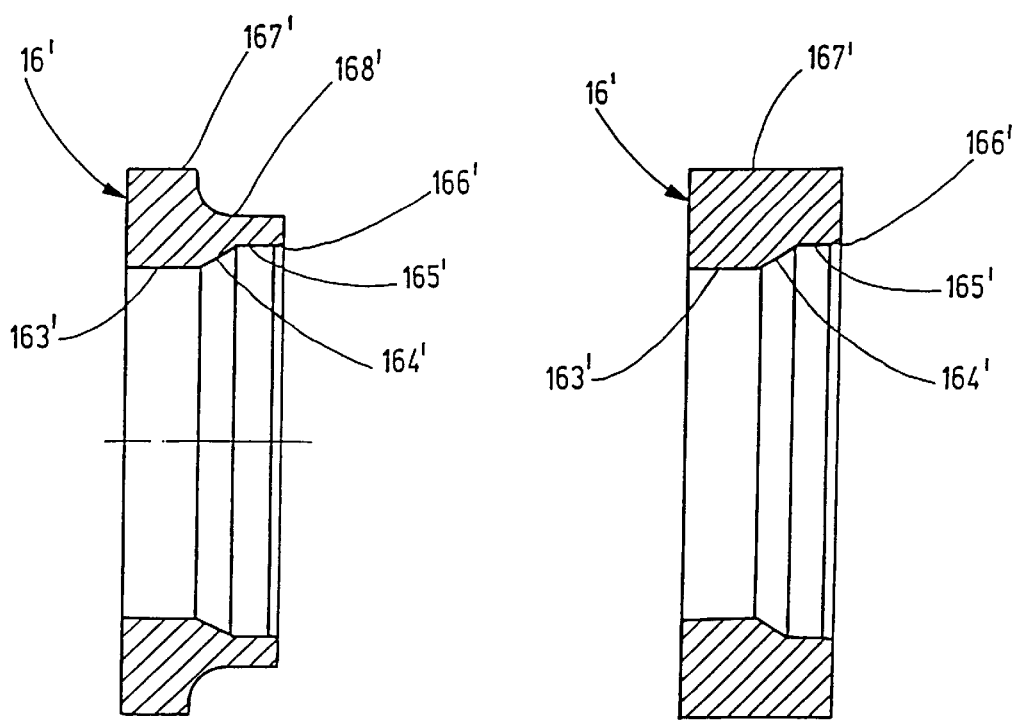
FIGS. 3a and 3b, a longitudinal section of the bush, press-fitted onto the solid cylinder, to illustrate the stepped piston of the piston pump of FIG. 2, in accordance with two exemplary embodiments.

To clarify the embodiment of the bush 16', this element is shown once again in longitudinal section in FIG. 3a. A slightly modified bush 16' is shown in FIG. 3b. In both variants, that is, those shown in FIGS. 3a and 3b, the inside diameter of the bush 16' is graduated. The bush 16' has a smaller-diameter portion 163', a larger-diameter portion 165', a shoulder 164' at the transition between the two portions 163' and 165', and a chamfer 166' and an outer diameter 167'.

The diameter of the smaller-diameter bush portion 163' is adapted with relatively great play to the smaller-diameter cylinder portion 141, in such a way that the bush 16' can be slipped onto the cylinder 14 easily and without resistance until the larger-diameter portion 165' of the bore reaches the larger-diameter cylinder portion 142. Viewed in the axial direction, the smaller-diameter bush 163' can be fairly short.

The inclination of the conically extending shoulder 164' and the inclination of the conically embodied shoulder 15 of the solid cylinder 14 are adapted to one another, but an angular difference would do no harm, either. Because the shoulder 164' is conically inclined, it is substantially easier to slip the bush 16' onto the solid cylinder 14 over the edge at the transition between the left-hand end face 122 and the smaller-diameter cylinder portion 141, without having to provide this edge of the solid cylinder 14 with a chamfer.

The diameter of the larger-diameter portion 165' of the bore and the diameter of the larger-diameter cylinder portion 142 are adapted to one another such that once the bush 16' has been slipped all the way onto the solid cylinder 14, the larger-diameter portion 165' of the bore is held with a press fit on the larger-diameter cylinder portion 142. Because it is easily possible to produce the larger-diameter cylinder portion 142 and the larger-diameter bush portion 165' with high precision, a precise alignment of the bush 16' on the solid cylinder 14 is obtained without major effort.

The outer diameter 167' of the bush 16' is adapted to the diameter of the cylinder wall 111 in such a way that the smallest possible gap exists between these two diameters, so as to prevent the slide ring 16 from invading the gap between the cylinder wall 111 and the outer diameter 167', and on the other, this gap should be large enough to prevent the bush 16' from touching the cylinder wall 111. Because the bush 16' is held with high precision on the solid cylinder 14, it is possible to make the gap between the outer diameter 167' and the cylinder wall 111 fairly small.

To make it easier to slip the larger-diameter bush portion 65' over the larger-diameter cylinder portion 142, the chamfer 166' is provided on the leading end of the larger-diameter bush portion 165'.

By using a suitably shaped tool, the inside diameter of the bush 16' that encompasses the bush portions 163' and 165', the shoulder 164 and the chamfer 166 can be made in one operation with high precision, without major effort. Because of the guide 32b, the larger-diameter cylinder portion 142 must be embodied with high precision. Because the bush 16', in the exemplary embodiment shown in FIG. 2, is supported in the radial direction on the larger-diameter cylinder portion 142 that because of the guide 32b is made with high precision, no extra machining of the cylinder 14 in the radial direction is necessary in order to firmly hold the bush 16'.

The two variant embodiments of the bush 16' shown in FIGS. 3a and 3b differ from one another in that in the exemplary embodiment shown in FIG. 3a, a turned recess 168' is provided on the outer diameter 167, on the side remote from the slide ring 18. Various built-in fixtures, such as a filter screen, not shown, may be provided between the slide ring 16' and the guide 32b (FIG. 1). For the sake of an overall structural size that is as small as possible, the turned recess 168' is provided so as to create space for the built-in fixtures.

The bush 16 or 16' is firmly held on the cylinder 14 of the stepped piston 12. Viewed in the radial direction, the bush 16, 16' is firmly held on the smaller-diameter cylinder portion 141 (FIG. 1) or on the larger-diameter cylinder portion 142 (FIG. 2). Viewed in the axial direction, the bush 16 or 16' is firmly held on the shoulder 15 toward the high-pressure chamber 22. If the stepped piston 12, during a one-way stroke pushes the hydraulic fluid in the direction of the pressure conduit 24, then the pressure in the high-pressure chamber 22 is substantially higher than the pressure in the low-pressure chamber 21. The difference between these two pressures urges the bush 16, 16' toward the shoulder 15. It may happen that during a one-way stroke, the pressure in the low-pressure chamber 21 is zero while the pressure in the high-pressure chamber 22 reaches a high value. Because of the shoulder 15 on the cylinder 14, oriented toward the high-pressure chamber 22, intercepting the force acting on the bush 16, 16' presents no difficulty. It does not matter whether the shoulder 15 extends radially (FIG. 1) or is conically inclined (FIG. 2).

The seal 17, which preferably comprises an elastomer material, seals off the high-pressure chamber 22 from the low-pressure chamber 21. The seal 17 is retained in the axial direction by the bush 16, 16'. The seal 17 extends over the entire height of the annular space between the cylinder wall 111 and the smaller-diameter cylinder portion 141. As a result, the seal 17 can assure that no hydraulic fluid can escape from the high-pressure chamber 22 through the gap between the outer diameter of the bush 16, 16' and the cylinder wall 111, nor between the inside diameter of the bush 16, 16' and the cylinder 14, so as to reach the low-pressure chamber 21. It should also be noted that it is also possible to seal off the bush 16, 16' with one separate seal each on its outer diameter and its inner diameter, but this would require the insertion of a plurality of seals. The exemplary embodiments shown in the drawing have the advantage that with the single seal 17, it is possible to seal off the high-pressure chamber 22 from the low-pressure chamber 21.

The foregoing relates to preferred exemplary embodiments of the invention, it being understood that other variants and embodiments thereof are possible within the spirit and scope of the invention, the latter being defined by the appended claims.

What is claimed is:

1. A piston pump for pumping hydraulic fluid for vehicle brake systems, comprising a stepped piston axially displaceable in a pump space (11), said piston includes one piston portion which divides the pump space into a low-pressure chamber (21) and a high-pressure chamber (22) of variable chamber volume, the stepped piston (12) includes a cylinder portion (14) which forms a larger diameter cylinder portion (142), and a smaller diameter cylinder portion (141) having a shoulder (15) oriented toward the high-pressure chamber (22) at a transition between said larger-diameter cylinder portion (142) and said smaller diameter cylinder portion (141), and a bush (16, 16') holds an elastomer seal (17) that seals the high-pressure chamber (22) off from the low-pressure chamber (21).

2. A piston pump in accordance with claim 1, in which the bush (16, 16') holds a seal (17) that seals the high-pressure chamber (22) off from the low-pressure chamber (21).

3. A piston pump in accordance with claim 1, in which the bush (16, 16') holds a slide ring (18) that guides the stepped piston (12) in the pump space (11).

4. A piston pump in accordance with claim 2, in which the bush (16, 16') holds a slide ring (18) that guides the stepped piston (12) in the pump space (11).

5. A piston pump in accordance with claim 1, in which the bush (16; 16') is pressed onto the cylinder (14) by a force-locking engagement.

6. A piston pump in accordance with claim 2, in which the bush (16; 16') is pressed onto the cylinder (14) by a force-locking engagement.

7. A piston pump in accordance with claim 3, in which the bush (16; 16') is pressed onto the cylinder (14) by a force-locking engagement.

8. A piston pump in accordance with claim 2, in which the bush (16; 16') rests with an end face, remote from the elastomer seal (17) on a shoulder (15) encompassing a circumference of the cylinder (14).

9. A piston pump in accordance with claim 3, in which the slide ring (18) is disposed between the bush (16) and an elastomer seal (17) and comprises plastic.

10. A piston pump in accordance with claim 5, in which the slide ring (18) is disposed between the bush (16) and an elastomer seal (17) and comprises plastic.

11. A piston pump in accordance with claim 8, in which the slide ring (18) is disposed between the bush (16) and an elastomer seal (17) and comprises plastic.

12. A piston pump in accordance with claim 1, in which a piston restoring spring (13) embodied as a helical compression spring is supported on one end against an abutment (20) in the pump space (11) and on another end is supported on the stepped piston (12).

13. A piston pump in accordance with claim 1, which includes a connection between the two pump chambers (21, 22) that is closable by means of a control member.

14. A piston pump in accordance with claim 13, in which the connection between the two pump chambers (21, 22) is embodied as bores (25, 26) in the stepped piston (12), and the control member is embodied as a check valve (27).

15. A piston pump in accordance with claim 5, in which a portion (141) of the cylinder (14) defined by the bush (16; 16') has an outside diameter that is reduced compared with the cylinder diameter, and that the shoulder (15) forms a transition between outer faces of the smaller-diameter portion (141) and the larger-diameter cylinder portion (142).

16. A piston pump in accordance with claim 15, in which the bush (16) is seated on the smaller-diameter cylinder portion (141), and the force-locking engagement is established between the inner face of the bush (16) and the outer face of the smaller-diameter cylinder portion (141).

17. A piston pump in accordance with claim 15, in which the bush (16'), by the graduation of its inside diameter, has one bush portion (163) with a smaller inside diameter and one bush portion (165) with a larger inside diameter, and that the bush (16') with its bush portion (163) having the smaller inside diameter is seated with relatively great play on the smaller-diameter cylinder portion (141), and the force-locking engagement is established between the annular inner face of the bush portion (165) having the larger inside diameter and the outer face of the larger-diameter cylinder portion (142).

18. A piston pump in accordance with claim 17, in which, for simplified assembly of the bush (16), the shoulder (164') that forms between the two bush portions (163', 165') is conically inclined.

19. A piston pump in accordance with claim 17, in which the larger-diameter cylinder portion (142) is ground to a precise diameter without sharp points.

20. A piston pump in accordance with claim 18, in which the larger-diameter cylinder portion (142) is ground to a precise diameter without sharp points.

* * * * *